United States Patent [19]

Plummer, III

[11] 3,925,856
[45] Dec. 16, 1975

[54] SELF LOCKING SEAM FORMING MEMBERS

[75] Inventor: Walter A. Plummer, III, Tempe, Ariz.

[73] Assignee: Walter A. Plummer, Sherman Oaks, Calif.

[22] Filed: Nov. 29, 1972

[21] Appl. No.: 310,257

[52] U.S. Cl...... 24/201 C; 24/201 HH; 24/230.5 R; 138/168
[51] Int. Cl.² ......................................... A44B 17/00
[58] Field of Search........... 138/168, 149; 24/201 C, 24/201 HH, 230.5 R; 161/48, 49

[56] References Cited
UNITED STATES PATENTS

| | | | |
|---|---|---|---|
| 2,198,415 | 4/1940 | Quarnstrom | 24/201 HH X |
| 2,937,664 | 5/1960 | Plummer | 138/168 X |
| 3,099,216 | 7/1963 | Jakobsen et al. | 138/168 X |
| 3,233,699 | 2/1966 | Plummer | 138/148 X |
| 3,369,568 | 2/1968 | Davis et al. | 138/168 |
| 3,495,306 | 2/1970 | Eichberg | 24/201 C |
| 3,554,237 | 1/1971 | Pelley et al. | 138/149 X |
| 3,638,286 | 2/1972 | Eichberg | 24/201 C |
| 3,654,049 | 4/1972 | Ausnit | 138/168 X |
| 3,728,187 | 4/1973 | Martin | 138/149 X |

Primary Examiner—Richard C. Queisser
Assistant Examiner—Daniel M. Yasich
Attorney, Agent, or Firm—Sellers and Brace

[57] ABSTRACT

A pair of extruded self-locking plastic seam-forming members and a heat insulating jacket for conduits and the like equipped with this seam. The jacket includes an impervious outer layer and one or more thick resilient heat insulating layers designed to be placed under compression acting in a plane transversely of and parallel to the seam so long as the jacket seam is closed, thereby resiliently holding the seam firmly closed in a fluid-tight manner and the outer layer in tension circumferentially of the jacket.

1 Claim, 2 Drawing Figures

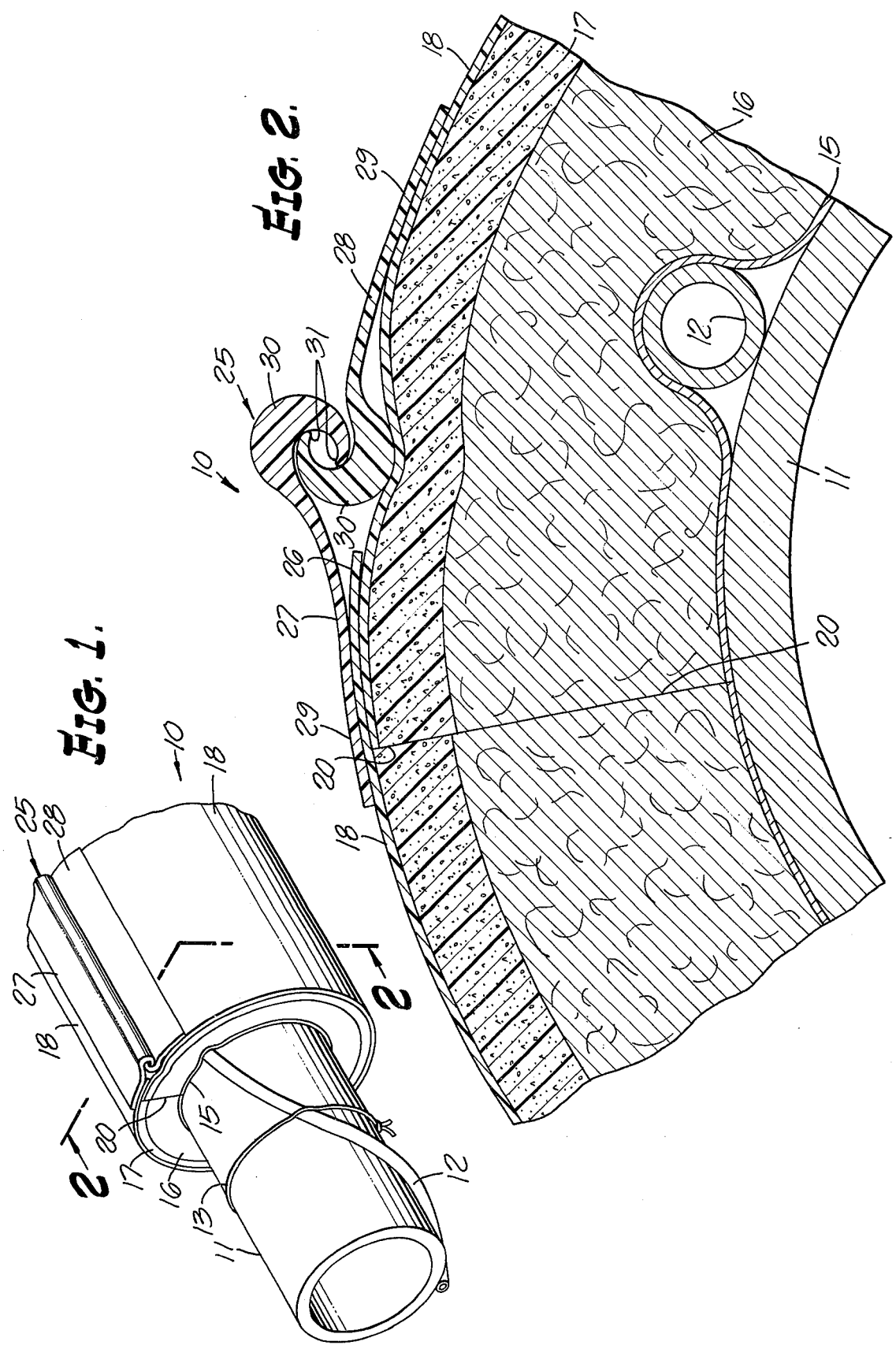

SELF LOCKING SEAM FORMING MEMBERS

This invention relates to self-locking plastic seams and a heat insulating jacket equipped therewith having a number of novel features.

Many proposals have been made heretofore for enclosing pipes, conduits and tubular passages generally with heat insulating jackets utilizing many different techniques and expedients for holding the insulating material assembled to the conduit. However, these prior proposals are subject to various shortcomings and disadvantages avoided by the present invention for various reasons including unsightliness, non-fluid-tight, complexity, costly, and time-consuming and costly to install. It has been proposed to use jacketing having a flexible sheet plastic exterior and utilizing an inerlocking seam to hold the jacket in place. However, the seam means previously provided requires tools or sliders of various constructions which must be manipulated lengthwise of the seam to close the seam. Attempts have been made to provide a seam of this general character and so designed as to provide a fluid seal when assembled but these constructions have not proven reliable and effective in practice. Another shortcoming of prior insulating jackets is the lack of adequate provision for ensuring a neat and uniformly contoured external appearance despite the presence of irregularities, obstructions or accessories on or associated with the conduit being jacketed.

The foregoing and other shortcomings of heat insulating jackets and of means provided thereon for holding the jackets assembled are obviated by the present invention. The jacket provided by this invention, in a typical embodiment, utilizes a multiple layered laminated body preferably including an inner layer of heat-reflecting material, a thick resilient layer of high efficiency heat insulating material, a second layer of porous, spongy, highly resilient material and an outer layer of supple, flexible, impervious material. The opposite lateral edge portions of the jacket are equipped with improved self-locking seam-forming means designed to interlock and provide a fluid-tight seal in reliance upon the elastic and resilient characteristics of the heat-insulating layers to maintain this seal intact. Additionally, the impervious outer layer is designed to be held in overlapping sealing contact by the elastic properties and characteristics of the heat-insulating material.

Accordingly, it is a primary object of this invention to provide an improved self-locking seam particularly suitable for use on resilient jacketing for conduits and tubular objects.

Another object of the invention is the provision of an improved heat-insulating jacket for tubular assemblies adapted to be assembled about such assemblies and locked in assembly position by a pair of fluid-tight seam-forming members.

Another object of the invention is the provision of a heat-insulating jacket for conduits equipped with seam-forming means extending lengthwise and designed to maintain a fluid-tight seal between overlapped edge portions of the jacket.

Another object of the invention is the provision of an improved heat-insulating jacket for conduits and the like having a flexible, impervious outer layer and underlying layers effective to accommodate themselves to irregularities in the structure jacketed, and to maintain the exterior layer of the jacket firmly and smoothly expanded.

These and other more specific objects will appear upon reading the following specification and claims and upon considering in connection therewith the attached drawing to which they relate.

Referring now to the drawing in which a preferred embodiiment of the invention is illustrated:

FIG. 1 is a fragmentary perspective view of an illustrative embodiment of the invention jacket in assembled position about a conduit; and FIG. 2 is a fragmentary cross-sectional view of a portion only of the FIG. 1 assembly taken along line 2—2 thereon.

Referring initially more particularly to FIG. 1, there is shown one illustrative embodiment of the invention jacket, designated generally 10, assembled about a conduit 11. In many instances such conduits are provided with a "tracer" or control tube 12 conveying a fluid for heating the contents of the conduit where such heating may be desirable for some reason as, for example, to lower the viscosity of the contents of conduit 11 or keep these contents from freezing under adverse temperature conditions. It will be understood that conduit 12 may comprise a strip electrical heater of a well known type having similar purposes and functions. Such tracer tubes or heaters may be secured to the exterior of conduit 11 in any suitable manner, as by tie strings 13 located at intervals along its length. Jacket 10 is best shown in FIG. 2 as comprising an inner layer 15 of aluminum foil or the like heat-reflecting material laminated to the adjacent surface of a thick layer 16 of resilient heat-insulating material, such as randomly arrayed glass fibers suitably bonded to one another at points of crossover.

A second heat-insulating layer 17 of spongy elastomeric material, preferably but not necessarily of the closed cell type, is laminated to the adjacent surface of layer 16 and its opposite surface is likewise suitably bonded and laminated to an impervious, flexible and supple outer layer 18 such as thermoplastic material. Layer 17 is preferably highly elastic and impervious to fluids.

It is pointed out that layers 15 and 16 and 17 have a width sufficiently greater than the circumference of the conduit to be enclosed or jacketed that their abutting edges 20 are placed in both radial and circumferential compression when assembled about the conduit and held so assembled by the interlocking seam designated generally 25. It will also be noted that the outer plastic layer 18 has a width substantially greater than the width of layers 16 and 17 to provide a sealing flap 26 underlying one of the seamforming members 25 and having an important function to be described more fully presently.

Interlocking seam 25 comprises a pair of seam-forming members 27,28 of identical generally J-shape configuration. The long stem portions 29 of these members provide a wide mounting strip 29 of approximately the same thickness as layer 18 which is secured along the lateral edge portions of layer 18 by heat fusing, bonding or other suitable technique. One lateral edge of each of the seam-forming members 27,28 is channel or crescent-shaped in cross-section, as is indicated at 30, and the bottom portion or of the crescent is several times thicker than the mounting strip 29. The opposite side walls of the C- or crescent shaped portion converge to a relatively thin lip edge at 31 whereas the opposite edge merges with mounting strip 29. As herein illustrated by way of example the depth of the crescent shaped portion corresponds generally with the span or width of the entrance into this portion.

The exterior surfaces of the free lip edge of the crescent-shaped portions are generally complemental in shape to the interior surfaces of the trough along the opposite side as clearly appears in FIG. 2. Another feature of the design is the fact that a median plane through the mounting strips 29, when the seam members are assembled and under load, preferably substantially bisects the distance between the side walls of the trough-shaped portions of the seam members in their normally assembled position. Another characteristic of the assembled seam when under load is the fact that the lip edges of the crescent shaped portion of the seam members lie on the opposite sides of a plane passing through mounting strips 29. In consequence, the relatively thin and flexible lip edge portions of the seam members contact the interior surface of the two trough shaped portions along line lying close to the plane of mounting strip 29. Moreover, the wide openings into the channel-shaped interior portions face in opposite directions and toward the respective mounting webs. It follows that these channel portions are readily interlocked with one another as they are overlapped and then released into intersecting and interlocking engagement.

Once interlocked, the seam forming members are held positively engaged by the compressive forces acting between the abutting edges of the insulating layers 16 and 17 and in a plane extending transversely of and parallel to the jacket seam when closed. Since the circumference of these layers is substantially greater than that of conduit 11, layers 16 and 17 are under compression both radially and circumferentially of conduit 11 and these compressive forces mutually cooperate in holding seam members 27,28 interlocked.

Additionally, the radial compressive forces underlying the mounting strip 29 fo seam member 27 press outwardly against the free edge portion 26 of jacket layer 18 thereby forming a highly effective fluid-tight seal between the inner surface of member 26 and the underlying exterior surface of layer 18. This very effective seal is further augmented by the double seal provided by each of the free lip edges 31,31 of the channel-shaped members 30,30 of the seam.

It will also be observed from FIG. 2 that the exterior surface of jacket 10 is free of bulges radially opposite the tracer or control tube 12. This result is achieved because of the thickness, flexibility and resiliency of layers 16 and 17 and the ability of the foil layer 15 to accommodate itself to tube 12.

From the foregoing it will be recognized that the described heat-insulating jacket and the selflocking seam provided therefor represent a distinct advantage over prior constructions. The simple, self-locking seam 25 is readily assembled simply by overlapping the bulbous free edges of the seam forming members 27,28 until they overlap into internested engagement where they are firmly held in fluid-tight manner by the compressive forces acting circumferentially and radially of the resilient insulating layer of the jacket. No tools or sliders of any kind are required and the seam can be opened for disassembly or inspection simply by pressing the portions of the jacket to either side of the seam toward one another until the bulbous channel-shaped portions 30 of the seam are disengaged. This operation is usually performed near one end of the seam following which the outer free edge of the disengaged seam can be lifted away from the other seam member progressively toward the other end of the jacket until the full length of the seam is disengaged. The assembled jacket is unusually neat in appearance, free from both depressions or protuberances and fastener devices.

While the particular self-locking seam-forming members herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A pair of continuous inter-engaging seam-forming members extruded from plastic material, said seam-forming members being of the same J-shape in cross section and each including a stem portion integral with one edge of a crescent shaped trough portion, the trough portions of said seam forming members being interlockable when overlapped with their open sides facing toward one another, the free lip edge of each trough shaped portion being engageable with the interior surface of the trough portion of the other seam forming member generally in the plane of the stem portion thereof, said stem portion being relatively wide thin and flexible, said trough shaped portion having a relatively non-flexible mid-portion several times thicker than said stem portion and with the opposed sidewalls of said trough shaped portion converging from said thick mid-portion to provide a relatively thin entrance lip edge and the other sidewalls tapering into a merger with said relatively thin stem portion, and the stem portions of said seam forming members lying generally in a common plane passing between said free lip edges of said trough shaped portions when said seam forming members are assembled and under tension load crosswise of the seam.

* * * * *